(12) United States Patent
Hein

(10) Patent No.: US 10,906,352 B2
(45) Date of Patent: Feb. 2, 2021

(54) SEGMENTED WHEEL AND METHOD AND SYSTEM FOR CONTROLLING A SEGMENTED WHEEL

(71) Applicant: X-SIM LLC, Cherry Hill, NJ (US)

(72) Inventor: Carl E. Hein, Cherry Hill, NJ (US)

(73) Assignee: X-Sim LLC, Cherry Hill, NJ (US)

( * ) Notice: Subject to any disclaimer, the term of this patent is extended or adjusted under 35 U.S.C. 154(b) by 143 days.

(21) Appl. No.: 15/882,656

(22) Filed: Jan. 29, 2018

(65) Prior Publication Data

US 2019/0030950 A1 Jan. 31, 2019

Related U.S. Application Data

(63) Continuation-in-part of application No. 14/214,109, filed on Mar. 14, 2014, now Pat. No. 9,878,576.

(60) Provisional application No. 61/787,400, filed on Mar. 15, 2013.

(51) Int. Cl.
*B60B 19/04* (2006.01)
*B60B 15/22* (2006.01)

(52) U.S. Cl.
CPC .............. *B60B 19/04* (2013.01); *B60B 15/22* (2013.01); *B60B 2900/721* (2013.01)

(58) Field of Classification Search
CPC ........ B62D 57/00; B62D 57/02; B60B 15/22; B60B 19/04; B60B 2900/721
USPC ................................... 305/1, 3, 4, 5; 180/8.1
See application file for complete search history.

(56) References Cited

U.S. PATENT DOCUMENTS

| 210,492 | A | * | 12/1878 | Broja | B62D 57/00 180/8.7 |
| 788,504 | A | * | 4/1905 | Green | B60B 15/18 305/5 |
| 856,259 | A | * | 6/1907 | Jones | B60B 15/18 305/2 |

(Continued)

FOREIGN PATENT DOCUMENTS

| CA | 2157280 A1 | 3/1994 |
| CN | 20170620 | 12/2015 |

(Continued)

OTHER PUBLICATIONS

Anonymous, "Dymanically Augmenting Wheel System", 1 page, found at <http://www.inewidea.com/2009/03/26/7304.html>.

*Primary Examiner* — Ruth Ilan
*Assistant Examiner* — Conan D Duda
(74) *Attorney, Agent, or Firm* — Howard IP Law Group, PC

(57) ABSTRACT

An adaptable wheel has a central hub, radial segments connected to the central hub at a proximal end and extending radially from the central hub, each radial segment having a linear actuator configured to change a length of the radial segment; a shoe connected to a distal end of the radial segment for contacting a surface being traversed by the wheel; and a locking mechanism for selectively preventing linear motion of the linear actuator. A control system for an adaptable wheel includes a distance sensor on a vehicle for determining distance to a surface in the path of the vehicle and a computer for receiving distance information from the distance sensor and, responsive to the distance information, determine a desired length of a segment of an adaptable wheel for maintaining a hub of a wheel level, and provide control signals to a linear actuator of the segment.

7 Claims, 7 Drawing Sheets

(56) References Cited

U.S. PATENT DOCUMENTS

| | | | | |
|---|---|---|---|---|
| 861,625 A * | 7/1907 | Wooley | B60B 15/18 | 305/5 |
| 975,117 A * | 11/1910 | Bower | B60B 15/18 | 305/5 |
| 1,040,945 A * | 10/1912 | Heagney | B60C 7/18 | 152/262 |
| 1,119,092 A * | 12/1914 | May | B60B 15/18 | 305/5 |
| 1,191,908 A * | 7/1916 | Petrak | B60B 15/18 | 305/3 |
| 1,224,953 A | 5/1917 | O'Conner | | |
| 1,263,726 A * | 4/1918 | Altgelt | B62D 57/00 | 180/8.7 |
| 1,298,781 A * | 4/1919 | Tolotti | B60B 15/18 | 305/5 |
| 1,334,064 A * | 3/1920 | Wildman | B60B 15/18 | 305/5 |
| 1,348,070 A * | 7/1920 | Whitaker | B60B 15/18 | 305/3 |
| 1,350,457 A * | 8/1920 | Hofmeister | B60B 15/18 | 305/5 |
| 1,365,973 A * | 1/1921 | Fisher | B60B 15/18 | 305/3 |
| 1,367,661 A * | 2/1921 | Ingram | B60B 15/18 | 305/3 |
| 1,371,980 A * | 3/1921 | Ramsey | B60C 7/18 | 152/291 |
| 1,372,951 A * | 3/1921 | Ingram | B60B 15/18 | 305/3 |
| 1,377,447 A * | 5/1921 | Starr | B60B 15/18 | 305/5 |
| 1,388,737 A * | 8/1921 | Maris | B60B 15/18 | 305/5 |
| 1,389,460 A * | 8/1921 | Scanlan | B60B 15/18 | 305/5 |
| 1,402,717 A * | 1/1922 | Charley | B60B 9/08 | 152/13 |
| 1,413,608 A * | 4/1922 | Overboe | B60C 7/18 | 152/291 |
| 1,435,042 A * | 11/1922 | Zottoli | B60C 7/18 | 152/289 |
| 1,435,815 A * | 11/1922 | Daubenheyer | B60B 15/18 | 305/5 |
| 1,439,847 A * | 12/1922 | Slauson | B60B 15/18 | 305/4 |
| 1,441,303 A * | 1/1923 | Slauson | B60B 15/18 | 305/4 |
| 1,469,393 A * | 10/1923 | O'Connor | B60B 9/06 | 152/14 |
| 1,486,236 A * | 3/1924 | Fisher | B60B 15/18 | 305/3 |
| 1,486,597 A * | 3/1924 | Miller | B60B 15/18 | 301/39.1 |
| 1,494,511 A * | 5/1924 | Starr | B60B 15/18 | 305/5 |
| 1,510,426 A * | 9/1924 | Tyd | B60B 15/18 | 305/5 |
| 1,532,273 A * | 4/1925 | Starr | B60B 15/18 | 305/5 |
| 1,554,333 A * | 9/1925 | Carlson | B60B 15/18 | 305/3 |
| 1,565,757 A * | 12/1925 | Slauson | B60B 15/18 | 305/4 |
| 1,586,931 A * | 6/1926 | Wine | B60B 15/18 | 305/4 |
| 1,594,257 A * | 7/1926 | Guerrini | B60B 15/18 | 305/4 |
| 1,620,460 A * | 3/1927 | Guerrini | B60B 15/18 | 305/45 |
| 1,634,048 A * | 6/1927 | Starr | B60B 15/18 | 305/5 |
| 1,634,683 A * | 7/1927 | Probst | B60B 15/18 | 305/4 |
| 1,666,036 A * | 4/1928 | Wine | B60B 15/18 | 305/4 |
| 1,699,057 A * | 1/1929 | Fisher | B60B 15/18 | 305/3 |
| 1,705,796 A * | 3/1929 | Wine | B60B 15/18 | 301/46 |
| 1,715,881 A * | 6/1929 | Wine | B60B 15/18 | 29/894.351 |
| 1,721,769 A * | 7/1929 | Campodonico | B60B 15/18 | 305/2 |
| 1,754,569 A * | 4/1930 | Passega | B60B 15/18 | 305/4 |
| 1,793,985 A * | 2/1931 | Wine | B60B 15/18 | 305/4 |
| 1,800,600 A * | 4/1931 | Campodonico | B60B 15/18 | 305/5 |
| 1,840,779 A * | 1/1932 | Johnston | B60B 15/18 | 305/19 |
| 1,844,440 A * | 2/1932 | Rosenthal | B60B 15/18 | 305/5 |
| 1,901,544 A * | 3/1933 | Welsford | B60B 15/18 | 305/4 |
| 1,921,537 A * | 8/1933 | Osman | B60B 15/18 | 305/5 |
| 1,932,604 A * | 10/1933 | Roberts | B60B 15/18 | 301/46 |
| 2,140,845 A * | 12/1938 | Moen | B60B 15/20 | 305/5 |
| 2,146,175 A * | 2/1939 | Dillingham | B60B 15/18 | 305/5 |
| 2,191,762 A | 2/1940 | Horn | | |
| 2,193,149 A * | 3/1940 | Ulrich | B60B 15/18 | 305/4 |
| 2,272,135 A * | 2/1942 | Singer | B60B 15/22 | 305/19 |
| 2,332,037 A * | 10/1943 | Wine | B60B 15/18 | 303/54 |
| 2,335,372 A * | 11/1943 | Wine | B60B 15/18 | 305/4 |
| 2,383,282 A * | 8/1945 | Wine | B60B 15/18 | 301/56 |
| 2,496,924 A | 2/1950 | Weeks | | |
| 2,916,331 A * | 12/1959 | Gardner | B60B 19/04 | 305/19 |
| 3,140,899 A * | 7/1964 | Weiss | B60B 15/22 | 305/5 |
| 3,179,431 A * | 4/1965 | Pikl | A61G 5/061 | 280/5.2 |
| 3,253,632 A | 5/1966 | Dalrymple | | |
| 3,802,743 A | 4/1974 | Hermanns | | |
| 4,046,339 A * | 9/1977 | Stancliffe | B64C 25/36 | 244/103 R |
| 4,108,231 A * | 8/1978 | Holchuk | B60B 9/06 | 152/290 |
| 4,211,268 A * | 7/1980 | Ravnikar | B60B 9/26 | 104/281 |
| 4,420,192 A * | 12/1983 | Holchuk | B60B 9/28 | 152/290 |
| 4,467,250 A * | 8/1984 | Thomasson | H02P 7/03 | 318/40 |
| 4,516,960 A * | 5/1985 | Rathert | F16H 55/54 | 474/47 |
| 4,547,173 A * | 10/1985 | Jaworski | A63H 17/262 | 446/457 |
| 4,736,771 A * | 4/1988 | McCafferty | F16K 5/0207 | 137/614.17 |
| 4,917,162 A * | 4/1990 | De Longcamp | B60B 3/02 | 152/5 |
| 5,053,685 A | 10/1991 | Bacchi | | |
| 5,102,367 A | 4/1992 | Mullaney et al. | | |
| 5,361,186 A | 11/1994 | Tanie et al. | | |
| 5,372,170 A | 12/1994 | Hynes | | |
| 5,380,075 A * | 1/1995 | Haws | B60B 15/18 | 280/5.2 |

(56) References Cited

U.S. PATENT DOCUMENTS

| | | | |
|---|---|---|---|
| 5,487,692 A | | 1/1996 | Mowrer |
| 5,492,390 A | * | 2/1996 | Kugelmann, Sr. ...... B60B 19/00 |
| | | | 301/5.1 |
| 5,744,884 A | | 4/1998 | Gerhard |
| 5,839,532 A | | 11/1998 | Yoshiji et al. |
| 5,839,795 A | | 11/1998 | Matsuda et al. |
| 5,964,381 A | | 10/1999 | El-Hadge |
| 6,264,283 B1 | | 7/2001 | Rehkemper et al. |
| 6,331,687 B1 | * | 12/2001 | Dunk ................ H01H 11/0062 |
| | | | 218/140 |
| 6,402,161 B1 | * | 6/2002 | Baghdadi ................ B62B 5/026 |
| | | | 180/8.2 |
| 6,893,369 B2 | * | 5/2005 | Fuerle ....................... F16H 9/24 |
| | | | 474/162 |
| 7,263,955 B1 | * | 9/2007 | Fischer .................. B62D 57/00 |
| | | | 123/46 R |
| 7,323,804 B2 | * | 1/2008 | Williams ................ B23Q 1/34 |
| | | | 310/323.02 |
| 7,380,618 B2 | * | 6/2008 | Gunderson ........ B62D 49/0635 |
| | | | 180/7.1 |
| 7,493,976 B2 | * | 2/2009 | Goldenberg ......... B62D 55/075 |
| | | | 180/9.1 |
| 7,503,567 B2 | * | 3/2009 | Frankie .................... A61G 5/04 |
| | | | 180/8.2 |
| 7,775,610 B2 | * | 8/2010 | Mettenbrink ........... B60B 15/06 |
| | | | 301/44.3 |
| 7,806,208 B2 | | 10/2010 | Gunderson et al. |
| 8,333,256 B2 | * | 12/2012 | Stolkin ................ B62D 55/075 |
| | | | 180/6.7 |
| 8,571,711 B2 | * | 10/2013 | Jacobsen ................ B08B 9/045 |
| | | | 180/9.21 |
| 8,631,844 B2 | * | 1/2014 | Anderfaas ................. B60B 9/04 |
| | | | 152/69 |
| 8,905,490 B2 | * | 12/2014 | Norman .................. B60B 11/02 |
| | | | 180/218 |
| 9,045,013 B2 | * | 6/2015 | Fink .................... B60B 11/1637 |
| 9,290,054 B2 | * | 3/2016 | Pfrenger ................... B60C 7/22 |
| 9,757,978 B1 | * | 9/2017 | Emigh .................... B60B 19/04 |
| 10,023,004 B2 | * | 7/2018 | Lin .......................... B60B 1/003 |
| 10,214,050 B1 | * | 2/2019 | Ebrahimi Afrouzi ........................ |
| | | | A47L 11/4072 |
| 10,427,453 B2 | * | 10/2019 | Apollonio .................. B60C 7/12 |
| 2002/0036104 A1 | | 3/2002 | Kerrebrock et al. |
| 2002/0179824 A1 | | 12/2002 | Arshad |
| 2004/0000439 A1 | | 1/2004 | Burt et al. |
| 2005/0116539 A1 | * | 6/2005 | Lu ............................ B60B 9/06 |
| | | | 305/4 |
| 2006/0076167 A1 | | 4/2006 | Setrakian et al. |
| 2006/0090938 A1 | | 5/2006 | Tanielian |
| 2006/0185911 A1 | | 8/2006 | Gunderson et al. |
| 2007/0227786 A1 | | 10/2007 | Hillis et al. |
| 2008/0102424 A1 | | 5/2008 | Holljes |
| 2010/0141018 A1 | | 6/2010 | McCue |
| 2010/0300589 A1 | | 12/2010 | Henry |
| 2011/0072920 A1 | | 3/2011 | Gronli |
| 2011/0080038 A1 | * | 4/2011 | Tan .......................... B60B 1/06 |
| | | | 301/62 |
| 2011/0226075 A1 | | 9/2011 | Nguyen |
| 2012/0032497 A1 | * | 2/2012 | Sheu ....................... B60B 1/041 |
| | | | 301/55 |
| 2013/0152717 A1 | | 6/2013 | Kopecek |
| 2013/0167991 A1 | * | 7/2013 | Donohue .................. B60B 9/26 |
| | | | 152/5 |
| 2014/0117637 A1 | * | 5/2014 | Solheim .................. B60B 25/00 |
| | | | 280/63 |
| 2014/0208935 A1 | | 7/2014 | Voiculescu |
| 2014/0265536 A1 | * | 9/2014 | Hein ....................... B60B 19/04 |
| | | | 301/91 |
| 2015/0084398 A1 | * | 3/2015 | Lee .......................... B60B 1/003 |
| | | | 301/66 |
| 2015/0239288 A1 | * | 8/2015 | Niblock .................. B60B 15/22 |
| | | | 301/44.3 |
| 2015/0352896 A1 | | 12/2015 | Lee |
| 2016/0052575 A1 | * | 2/2016 | Kato ....................... B60B 15/26 |
| | | | 180/15 |
| 2016/0075176 A1 | * | 3/2016 | Solheim .................. B60B 9/26 |
| | | | 152/11 |
| 2016/0193877 A1 | | 7/2016 | Jang |
| 2016/0200139 A1 | | 7/2016 | Cha |
| 2017/0120672 A1 | | 5/2017 | Hurd |
| 2018/0257429 A1 | * | 9/2018 | Fourdrinier ............. B60B 25/02 |
| 2019/0030950 A1 | * | 1/2019 | Hein ....................... B60B 19/04 |
| 2019/0092090 A1 | * | 3/2019 | Solheim .................... B60B 9/26 |
| 2019/0092091 A1 | * | 3/2019 | Daniels .................... B60B 9/28 |
| 2019/0283496 A1 | * | 9/2019 | Solheim .................... B60B 9/26 |

FOREIGN PATENT DOCUMENTS

| | | |
|---|---|---|
| EP | 0607892 A1 | 7/1994 |
| WO | 2007001246 A1 | 1/2007 |
| WO | 2012100903 A1 | 8/2012 |
| WO | 2017046468 A1 | 3/2019 |

* cited by examiner

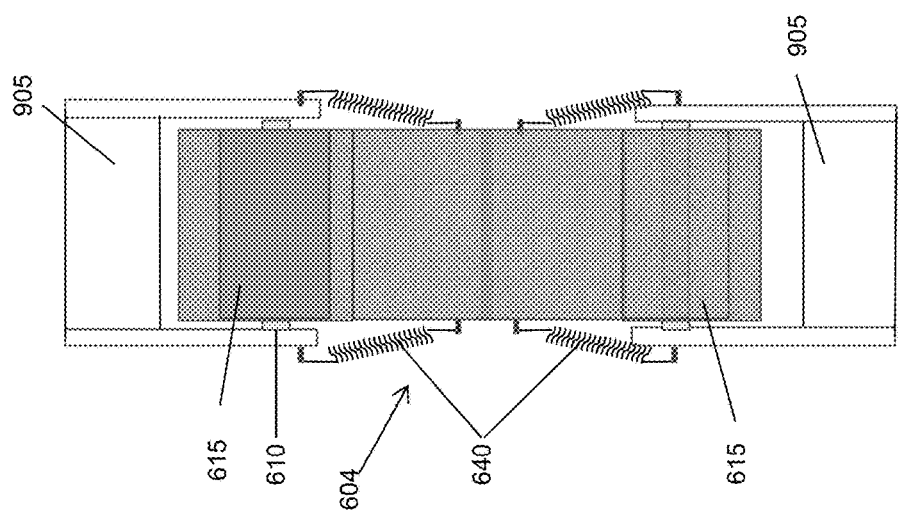
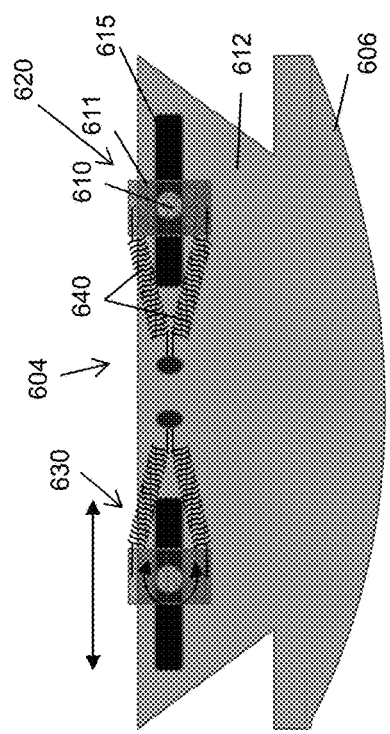
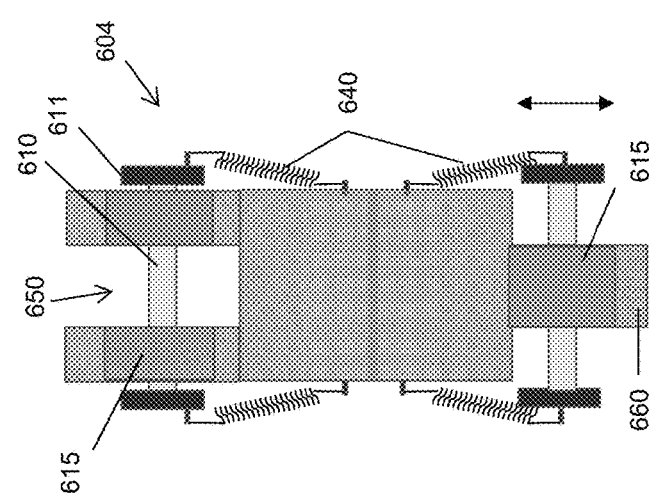
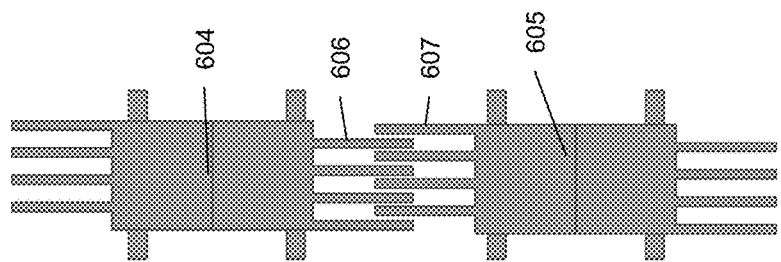

SEGMENTED WHEEL AND METHOD AND SYSTEM FOR CONTROLLING A SEGMENTED WHEEL

CROSS REFERENCE TO RELATED APPLICATIONS

This application is a continuation-in-part application of copending U.S. patent application Ser. No. 14/214,109 entitled SEGMENTED WHEEL AND METHOD AND SYSTEM FOR CONTROLLING A SEGMENTED WHEEL, filed Mar. 14, 2014, which issued on Jan. 30, 2018 as U.S. Pat. No. 9,878,576, which claims priority under 35 U.S.C. § 119(e) to U.S. Provisional Patent Application Ser. No. 61/787,400 entitled SEGMENTED WHEEL AND METHOD AND SYSTEM FOR CONTROLLING A SEGMENTED WHEEL, filed on Mar. 15, 2013, the subject matter of which are incorporated by reference herein in their entirety and for all purposes.

FIELD OF THE INVENTION

This application relates to vehicle wheels.

BACKGROUND OF THE INVENTION

Rough or irregular terrains pose difficulties for vehicles attempting to traverse such terrain. This is particularly true for robotic vehicles, and indeed robotic vehicles may frequently be called upon to traverse rough or irregular terrain. Various attempts have been made to alleviate these difficulties, including spring/damper and active suspensions, hovercraft, and reciprocating leg mechanisms. However, these solutions suffer from a number of disadvantages. They variously tend be large and energy inefficient, expensive, generate noise and suffer limitations in speed, effectiveness and load bearing capabilities.

Circular wheels are attached at their center to a hub or axle attached to the frame of a vehicle through a suspension assembly. As the surface of the wheel contacts the surface over which the vehicle is traveling, the entire wheel rises or falls with the profile of the terrain surface. To prevent such non-rotational motion of the wheel from being transferred to the frame of the vehicle, the suspension assembly employs springs, shock absorbers or struts to absorb some of the force applied through the non-rotational movement of the wheel. These suspension systems are reactionary and adjust only after the wheel has changed its position relative to the vehicle frame. The suspension does not absorb all of the force of the wheel's motion and some of the energy applied by the force of the upward or downward motion of the wheel is transferred to the vehicle and its occupants.

A wheel system that addresses one or more of these disadvantages and/or is proactive and adjustable to provide a smooth ride would be beneficial.

SUMMARY

An adaptable wheel comprises a central hub, and radial segments connected to the central hub at a proximal end and extending radially from the central hub. Each radial segment includes a linear actuator configured to change a length of the radial segment. A shoe is connected to a distal end of the radial segment for contacting a surface being traversed by the wheel. A locking mechanism is configured to selectively prevent linear motion of the linear actuator. A control system for the adaptable wheel includes a distance sensor for determining distance to a surface in the path of the vehicle and a computer processor for receiving distance information from the distance sensor and, responsive to the distance information, determining a desired length of a segment of the adaptable wheel for maintaining the hub of the wheel level, and providing control signals to a linear actuator of the segment.

A computer controlled segmented wheel includes a plurality of adjustable radial segments. The first end of each radial segment is attached to a common hub at the center of the wheel. The second end of the radial segment includes a shoe assembly which comes into contact with the ground when the associated radial segment is in a position substantially perpendicular to the ground's surface and below the hub of the wheel. The outer surface of the shoe is coated with a friction producing material, such as rubber. As the wheel rotates about the hub, each radial segment contacts the surface as that radial segment rotates past the surface. The wheel assembly is attached to the frame of a vehicle at its hub. The vehicle includes a distance sensor that is configured to sense the distance from a fixed point on the vehicle frame to a point on the ground ahead of the vehicle in the vehicle's direction of travel. A computer receives information relating to the distance from the fixed point on the vehicle to a point on the ground in front of the vehicle and calculates a distance between the height of the hub and the ground surface at the measured point in the surface. Based on the distance between the vehicle and the measured point, a radial segment is identified which will be in contact with the ground surface at the measured point. A distance between the hub of the wheel and the measured point on the ground's surface is calculated. The computer sends an actuation control signal to a radial adjuster on the identified radial segment to adjust the length of the radial segment to match the calculated distance. By calculating the length of each radial segment based on a substantially constant distance between the hub and a point on the ground where each radial segment will contact the ground, the hub is maintained at a consistent height throughout the length of travel. Therefore, the vehicle does not experience movement proportional to the non-rotational movement of the wheel as the wheel is adapted to maintain a consistent height between the hub and the ground.

BRIEF DESCRIPTION OF THE DRAWINGS

FIG. 7 is a bottom view of an exemplary shoe for use in a wheel assembly according to an embodiment of the present disclosure.

FIG. 8A is a side view of an exemplary shoe for use in a wheel assembly according to an embodiment of the present disclosure.

FIG. 8B is a top view of the shoe of FIG. 8A.

FIG. 9 is a top view of an exemplary partial shoe assembly according to an embodiment of the present disclosure.

DETAILED DESCRIPTION

To maintain a smooth, steady and stable ride for a wheeled vehicle as it travels over a surface, the point at which the vehicle is coupled to the wheels must be maintained at a level height relative to a fixed altitude on the Earth's surface (e.g. level). As the wheel contacts irregularities on the surface, the wheel is urged upward or falls downward. According to an embodiment of this disclosure, a wheel and associated control system are configured to maintain a hub on which the wheel is mounted level over uneven terrain. A wheel includes a hub and a plurality of radial segments radiating outward from the hub. Each of the radial segments includes independent actuators for adjusting the segment length. A distance sensor detects the height of terrain toward which the wheel is moving. A computer receives the height data from the distance sensor. In response to the height data, the computer provides control signals to cause the actuators to adjust the segment length to maintain the hub level as the segment encounters the terrain.

Figure 1:
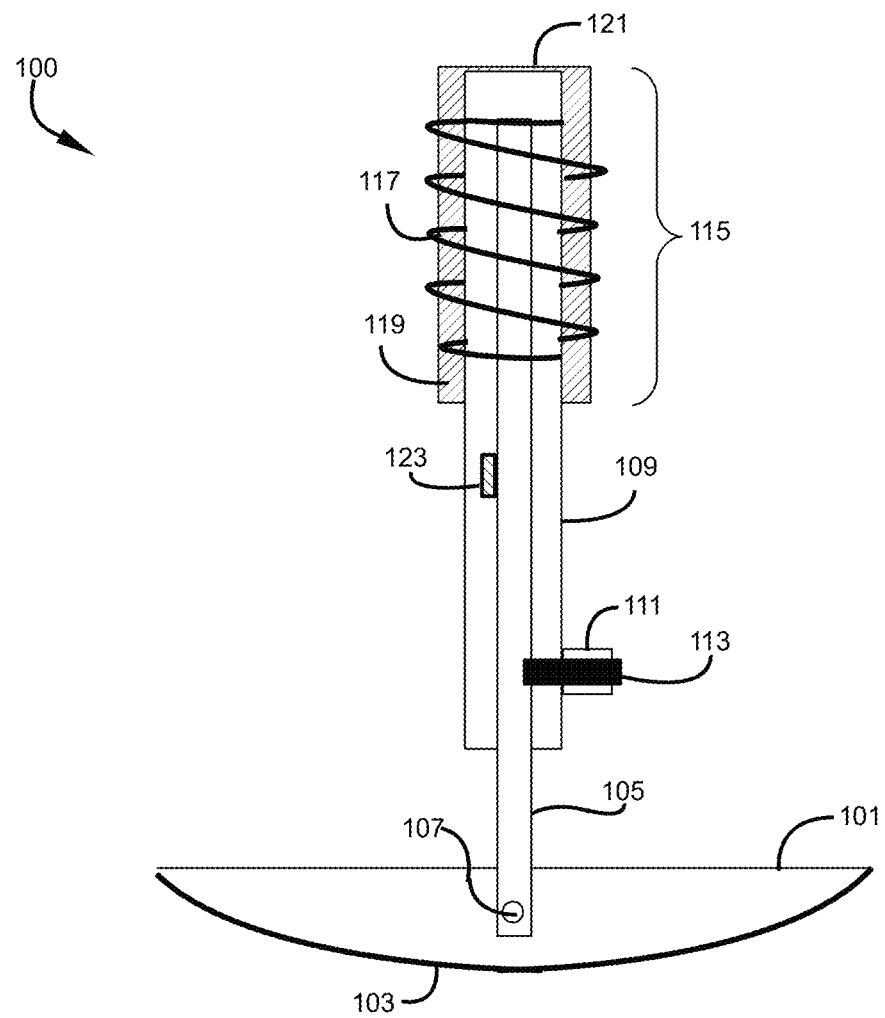
FIG. 1 is a partial cross-sectional view of a radial segment according to an embodiment of the present disclosure.

FIG. 1 is a partial cross-sectional view of an adjustable radial segment 100 which may be implemented as part of a wheel and associated control system. The radial segment 100 is defined generally by an actuator assembly comprised of an outer fixed sleeve 109 and a movable spoke 105. The spoke 105 and outer sleeve 109 have the same longitudinal axis. Spoke 105 is moveable along the common longitudinal axis. The spoke 105 is connected at a first end, or a distal end, of the actuator assembly to a shoe 101. The spoke 105 is coupled to the shoe 101 by a wrist joint 107 including a pin or axle. Wrist joint 107 allows the shoe 101 to pivot about an axis of the axle or pin and relative to the longitudinal axis of the actuator assembly.

Shoe 101 is a rigid body. The shoe 101 has an arcuate or convex lower surface 103 which contacts the ground or surface as the wheel rotates. The arcuate surface 103 defines an segment of a circle defining the outer diameter of a wheel assembly (such as wheel assembly 200 of FIG. 2). The length of the segment defined by the arcuate surface 103 depends on the number of radial segments 100 used to make up a wheel assembly. Any number of radial segments 100, greater than two, may be used to make up a wheel assembly. Each arcuate surface 103 will be defined as a segment defining an angle between the ends of the segment and the center hub of the wheel assembly, where the angle is determined according to the formula: 360°÷(number of segments).

The convex surface 103 of shoe 101 may be covered with a layer of high friction material such as rubber. The high friction material aids in traction. The high friction material may be is adhered directly to the arcuate surface 103. As shoe 101 is a rigid body, shoe 100 is not a pneumatic tire. Therefore, a wheel having a plurality of radial segments 100 is a run-flat wheel.

The radial segment 100 is adjustable in length between the first end at shoe 101 and the second, or proximal, end at the attachment point 121 to the hub (not shown). To maintain the radial segment's 100 length while supporting the weight of the vehicle, a locking mechanism 111 is provided. The locking mechanism is configured to selectively fix the length of radial segment 100. Locking mechanism 111 may include an actuator, which actuator receives control signals from a controller or computer. Locking mechanism 111 may be configured to selectively fix the relative positions of outer sleeve 109 and spoke 105, thereby fixing the length of radial segment 100. In an embodiment, locking mechanism may be mounted on and fixed in position on outer sleeve 109, and selectively engageable with spoke 105.

In the illustrated embodiment, locking mechanism 111 has a locking pin 113 movably mounted in an aperture in the wall of outer sleeve 109. The locking pin 113 may be moved from a first position in which the radial segment 100 is unlocked and a second position in which the radial segment 100 is locked. When in an unlocked position, locking pin 113 is not in physical contact with spoke 105; spoke 105 is free to move relative to outer sleeve 109. In a locked position, the locking pin 113 is moved to a position where the locking pin 113 contacts the spoke 105. Locking pin 113 may engage spoke 105 through an aperture or bore in the spoke 105. In the case of a spoke without apertures or bores, locking pin 113 may be forced against the uniform outer surface of spoke 105 with enough force to create friction sufficient to prevent spoke 105 from sliding within outer sleeve 109. See, for example, FIG. 5, wherein locking pin 113 comprises a free end abutting an opposing uniform outer surface 112 of spoke 105 with enough force to create friction sufficient to prevent spoke 105 from sliding within outer sleeve 109. The locking pin 113 may be moved between a locked position and an unlocked position by an actuator, such as a solenoid or pneumatic or hydraulic arrangement, by way of example. The actuator may be configured to operate in response to control signals received from a connected controller, such as an onboard computer.

Radial segment 100 further has a sensor for detecting a present length of the radial segment 100. Such a sensor may provide an output signal indicative of the present length to a system controller or onboard computer. A sensor for detecting a present length of the radial segment 100 may be implemented by position sensor 123. Position sensor 123 is configured to sense the relative positions of spoke 105 and outer sleeve 109. Position sensor 123 is configured to provide an output voltage proportional to the sensed position. For example, position sensor 123 may be a rheostat connected to spoke 105 such that when the spoke 105 moves, position sensor 123 outputs a voltage proportional to the relative position of spoke 105.

Radial segment 100 further has one or more actuators for moving spoke 105 relative to outer sleeve 109. Linear actuator 115 is configured to provide linear motion of spoke 105 relative to outer sleeve 109. For example, as shown in FIG. 1 by way of non-limiting example, a conductive coil 117 wrapped around an electromagnetic core 119 may be used to create a solenoid which may be electrically controlled to provide linear motion of spoke 105. In other embodiments, linear actuator 115 may be in the form of a driven threaded interface, such as a worm gear, a pneumatic piston, a hydraulic piston, or other mechanism. Linear actuator 115 may be configured to move either of spoke 105 and outer sleeve 109 while holding the other fixed. Linear actuator may be configured to respond to control signals from a connected controller, such as an onboard computer.

Figure 2:
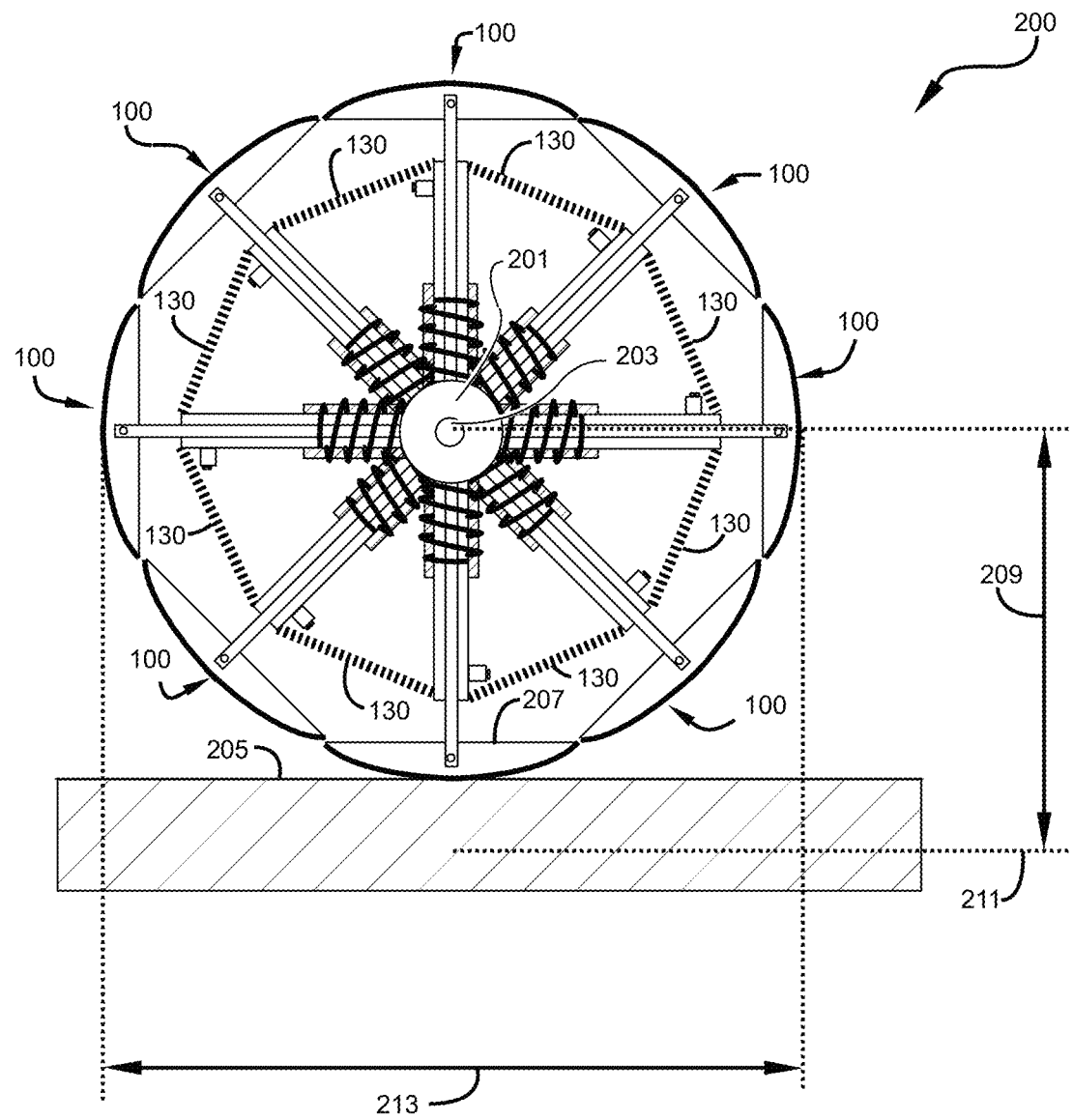
FIG. 2 is an elevation view of a wheel assembly comprising a plurality of radial segments of FIG. 1 according to an embodiment of the present disclosure.

FIG. 2 is a partial cross sectional elevation view of a wheel assembly 200 having a plurality of the radial segments 100 of FIG. 1 according to an embodiment of the present disclosure. Wheel assembly 200 includes a central hub 201 having a connection point 203 for coupling the wheel assembly 200 to the frame of a vehicle. Around the circumference of the hub 201, eight radial segments 100 are coupled to the hub 201 and extend radially from the hub 201 at regular angles to each other. Optionally according to another embodiment, each of a plurality of radial segments 100 making up a wheel may be secured to adjacent other radial segments 100 through a chordal member 130. The chordal member 130 provides additional torsional strength and stability and is attached to radial segment 100 at points on the fixed member of linear actuator 115 (shown in FIG. 1). Chordal member 130 may be comprised of a rigid material to provide structure integrity to the wheel. For example, chordal member 130 may comprise steel, stainless steel, aluminum, magnesium, plastic, or other suitable materials. Each radial segment 100 is independently adjustable in length while the vehicle is in motion.

Radial segment 207 is in contact with a surface 205 on which the wheel assembly 200 is rolling. A vertical height 209 is defined between the height of connection point 203 and a reference level 211. A controller may provide control signals to linear actuators and locking mechanisms of wheel assembly 200 to maintain connection point 203 level as wheel assembly 200 rotates. As surface 205 is level, linear actuators of radial segments 100 may be operated to set radial segments at a constant length. Locking mechanisms of the radial segments may be activated to lock the lengths of the radial segments. The diameter of the wheel defined by wheel assembly 200 may be fixed at length 213 so long as surface 205 remains level. In the present orientation, a shoe of one of the radial segments is in contact with surface 205. As the wheel assembly rolls, the radial segments may simply remain locked so long as surface 205 remains smooth and level.

By adjusting the length of each radial segment 100 at the point where the radial segment 100 is contacting surface 205, the height 209 between the reference level 211 and the hub connection point 203 may be kept substantially constant. Substantially constant means that as the wheel assembly 200 rotates and rolls over surface 205 the path of travel of connection point 203 remains level to an extent where the vehicle or its occupants do not adversely feel the effects of traveling over irregularities in surface 205. In further exemplary embodiments, Further control schemes or algorithms may be aimed at providing inertial balancing as wheel assembly 200 travels. Specifically, one or more radial segments 100 opposite one or more radial segments which are contacting the ground may be adjusted to be of equal radius or length to those contacting the ground in order to balance wheel assembly 200 for rotational inertia forces.

Another embodiment of the present disclosure may be illustrated by the wheel assembly of FIG. 2. Each radial segment 100 is adjustable to control the length between the hub 201 and the point at which the radial segment contacts the surface 205. By controlling the length of all radial segments 100 in the wheel assembly 200 simultaneously at a chosen length, the effective diameter 213 of the wheel assembly may be controlled. By increasing or decreasing the effective diameter 213 of wheel assembly 200, the distance covered by the wheel assembly 200 during one full revolution of the wheel may be changed. Thus, for a constant rotation rate of hub 201, the speed of travel of the vehicle may be controlled by increasing or decreasing the effective diameter 213 of wheel assembly 200. In this way computer adjustable wheel assembly 200 may be used as a continuously variable transmission (CVT) system. By way of example, if an onboard computer detects that the vehicle using one of more wheel assemblies 200 has started to climb a hill, the linear actuators of the radial segments of each wheel assembly may be driven to reduce the length of the linear actuators. The reduction in length results in a reduction in effective diameter of the wheel assemblies. Thus, the vehicle covers a shorter distance for the same number of rotations of hubs 201, but applies more torque to the ground for climbing the incline. The reduction in lengths of the radial segments serves as the equivalent of shifting a transmission to a lower gear. Similarly, if an onboard computer detects that the vehicle has ceased to move uphill, and is now moving on a level surface, the computer may provide a control signal to the linear actuators to increase the lengths of the radial segments. The increasing in lengths effectively increases the diameters of the wheel assemblies, and therefore serves as the equivalent of shifting a transmission to a higher gear. The use of one or more wheel assemblies 200 as a CVT can provide energy savings by saving the cost and weight of a traditional CVT transmission, as well as improve reliability and efficiency by eliminating unreliable, power-consuming components such as belts, cones, chains, and the like. It is further noted that the force acting on the adjustable surface of this CVT arrangement is limited to the weight of the vehicle itself, rather than a separate apparatus that utilizes or consumers power.

Figure 3:
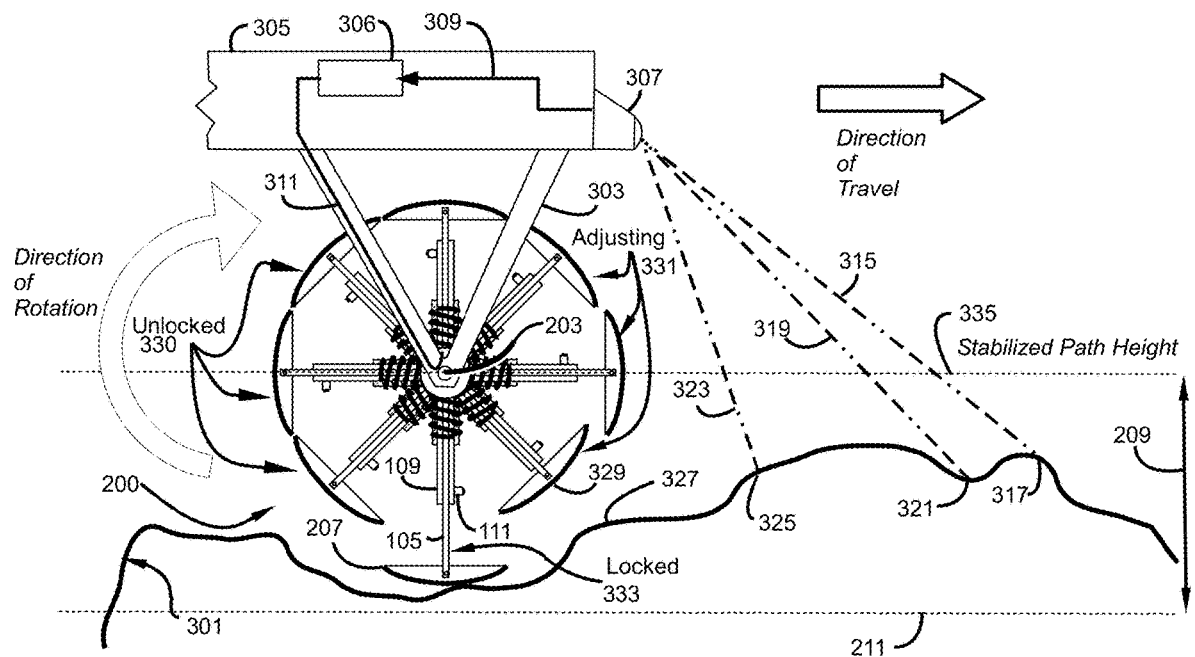
FIG. 3 is an elevation view of a vehicle equipped with the wheel assembly of FIG. 2 and a computer controlled distance sensing system according to an embodiment of the present disclosure.

FIG. 3 is an elevation view of a vehicle traversing a surface having irregular terrain, using the wheel assembly of FIG. 2 in accordance with an embodiment of the present disclosure. The vehicle includes a chassis 305 attached to a suspension frame 303 that is coupled to the hub connection point 203 of the wheel assembly. The suspension frame 303 is connected to the hub connection point 203 by an axle, bearing, or other mechanical coupling to allow the wheel assembly to rotate around the hub connection point 203. Radial segments are attached to the hub.

The wheel assembly is controlled by a computer 306. Computer 306 provides control signals to control the operation of linear actuator assemblies in each radial segment 100 (shown in FIG. 1). As with the radial segment of FIG. 1, the radial segments of FIG. 3 each include a linear actuator assembly for changing the length of the radial segment. The linear actuator assembly may be configured to move spoke 105 relative to outer sleeve 109 to length or shorten the length of the radial segment 207. An actuator-driven locking mechanism 111 between the outer sleeve 109 and the spoke 105 may be activated to lock the spoke 105 in a given position relative to the outer sleeve 109. The linear actuator assemblies and actuator-driven locking mechanisms may receive control signals from computer 306.

The actuator assembly allows the overall length of each radial segment 100 to be selectable. The length of the radial segment may be controlled such that at the time that a given radial segment (e.g. 207) comes into contact with the surface 301, the length of the overall radial segment 207 establishes the vertical distance 209 between the hub connection point 203 and a reference level 211. As radial segment 207 is in contact with surface 301, locking mechanism 111 has, in response to control signals from computer 306, locked the length of radial segment 207. The vertical distance 209 is maintained substantially constant as each subsequent radial segments 100 rotate into position where they make contact with surface 301.

The vehicle of FIG. 3 has a distance detection sensor 307. Distance detection sensor is configured to determine a distance from the vehicle to a surface in the immediate path of the vehicle in the direction of travel. The distance detection sensor is mounted on the vehicle with a direct line of sight to a surface in the immediate path of the vehicle. The distance detection sensor 307 emits a distance sensing signal 315, 319, 323 directed toward the surface 301. The signals are aimed at various angles and encounter the surface at points 317, 321, 325. The signals may be ultrasonic distance detecting signals, and the distance detection sensor may have receivers configured to detect a time of flight and calculate the distance to an object from which the signals are reflected, by way of example. Sensor 307 may emit ultrasonic pulses at a variety of angles, and determine distances to the ground associated with angle data. Sensor 307 may provide determined distance and angle data as inputs 309 to computer 306.

Computer 306 may include a processor, such as a computer processor, in data communication with a memory device for processing data relating to the determination of the height of surfaces in the path of travel and responsive control of the wheel assembly. Upon receiving inputs 309 containing and angle and distance information from sensor 307, computer, using vehicle speed data, and data concerning the current length of the radial segments, determines which radial segment 100 of the wheel assembly will be contacting the surface 301 at points in its path of travel 317, 321, 325. The vertical distance between level reference 211 and the points 317, 321, 325 may be determined. The vertical distance 209 is used as a baseline to compute the proper length of the determined radial segment 100, so that when the radial segment 100 contacts the distance point 317, 321, 325 at the elevation of the reference point on the surface 301, the height of radial segment 100 supports the hub connection point 203 at a substantially constant vertical distance 209 from the reference level 211.

Computer 306 outputs actuator control signals 311 which are transmitted to the actuator controls on wheel assembly 200. The actuator control signals 311 may be transmitted through cables or wires to rotary connectors at the hub of wheel assembly 200, or alternatively the actuator control signals may be provided to the radial segments by a wireless signal transmitted from a transmitter at the computer 306, such as a radiofrequency (RF) transmitter, and received at the radial segment by a compatible receiver. The actuator receives the actuator control signal 311. In response, the actuator causes the actuator assembly to linearly move spoke 105 to a new position relative to outer sleeve 109. The new position may be such that the overall length of the radial segment 100 matches a value determined by the computer. A position sensor 123 (shown in FIG. 1) may be configured to detect the position of spoke 105 in relation to outer sleeve 109. For example, position sensor 123 may be a rheostat connected to spoke 105 such that when the spoke 105 moves, position sensor 123 outputs a voltage proportional to the relative position of spoke. This voltage may be returned to computer 306. When the computer determines, based on the signal from the position sensor, that the spoke 105 is in a position corresponding to a determined target length of the radial segment. the computer may send a signal for the linear actuator to stop, and send a signal to locking mechanism 111 to lock the spoke 105.

As the wheel assembly rotates and a locked 333 radial segment breaks contact with the ground due to the wheel's rotation, the computer may provide an unlock signal to locking mechanism 111 to unlock 330 spoke 105. When unlocked, the spoke is free to move relative to outer sleeve 109 responsive to the linear actuator. The computer may calculate desired lengths of each segment, and successively provide control signals to cause linear actuators to move each segment to the desired length, and provide a locking signal. The moving and locking may occur after the computer has detected that the foot of the radial arm is no longer in contact with the surface and before the foot next contacts the surface. It should be noted that while the radial segment 100 is being adjusted 331, the radial segment is not supporting the weight of the vehicle because the radial segment is not in contact with the surface 301. Thus, no force is being applied to the radial segment, and the movement of the spoke 105 is unencumbered by any outside force. For this reason, little energy is needed to operate the linear actuator.

For example, distance sensor 307 detects the distance between distance sensor 307 and a point on surface 301, denoted as 327. There is a slight elevation in the surface 301 at point 327. The distance information is sent by distance sensor 307 as input 309 to computer 306. Computer 306 calculates, from the distance to point 327, the speed of the wheel assembly, which of the radial segments 100 will contact the surface 301 at point 327. An actuator control signal 311 is sent to the identified radial segment to adjust its length to the proper length 329 calculated by computer 306. As the wheel rotates near, but not to, the point where the radial segment contacts the ground, the actuator completes its adjustment of the length 329. The computer then causes the locking mechanism to lock the radial segment prior to contact with the ground or surface. When radial segment with length 329 contacts point 327 on surface 301, the vertical height of the hub connection point 203 will be at a substantially constant height 209. The elevation of the surface 301 at point 325 is compensated for by the distance sensor's 307 measurement, the computer's 306 calculation of the proper radial segment length 329, and the computer's control signals to adjust the length of the radial segments. The segment adjustment process is repeated for each successive radial segment as it rotates about the hub connection point 203. Thus, at each contact point with the surface 301, the hub connection point 203 is at a substantially constant height providing a stabilized path height 335. On uneven terrain, the length of each radial segment may be adjusted in each rotation of the wheel assembly.

The above-described system may be used for adjusting long-term height of a vehicle. That is, if the grade of terrain being traversed is rising and/or dropping, spoke or radial segment length requires control to allow the hub to gradually shift vertically. In an embodiment, this may be achieved by a distance sensor 307 that detects the coming terrain height immediately ahead of the wheel assembly. In other embodiments, in order to better accommodate grade changes, distance sensor 307 may comprise multiple distinct distance sensors, with at least one additional long distance sensor configured to detect the ground surface further ahead of the wheel assembly (relative to that detected by the above-described distance sensor) for identifying long term terrain grade slope changes. When this so-called long-distance sensor detects a change in the slope of the terrain ahead of the wheel assembly, it is configured to generate a control input that causes the spokes to smoothly and gradually allow their radii to adjust. In this way, the hub may be controlled so as to gradually rise or drop in accordance with the long-term grade of the terrain. Moreover, in order to ensure that the hub distance from the terrain stays within the minimum and maximum (min-max) extension of the spokes, the sensor system is configured to allow the wheel to begin adjusting height predictively, before the grade actually changes, and continuing to adjust after it has changed, thus further smoothing out the abruptness of such changes, as compared to traditional reactive suspension systems.

Figure 4:
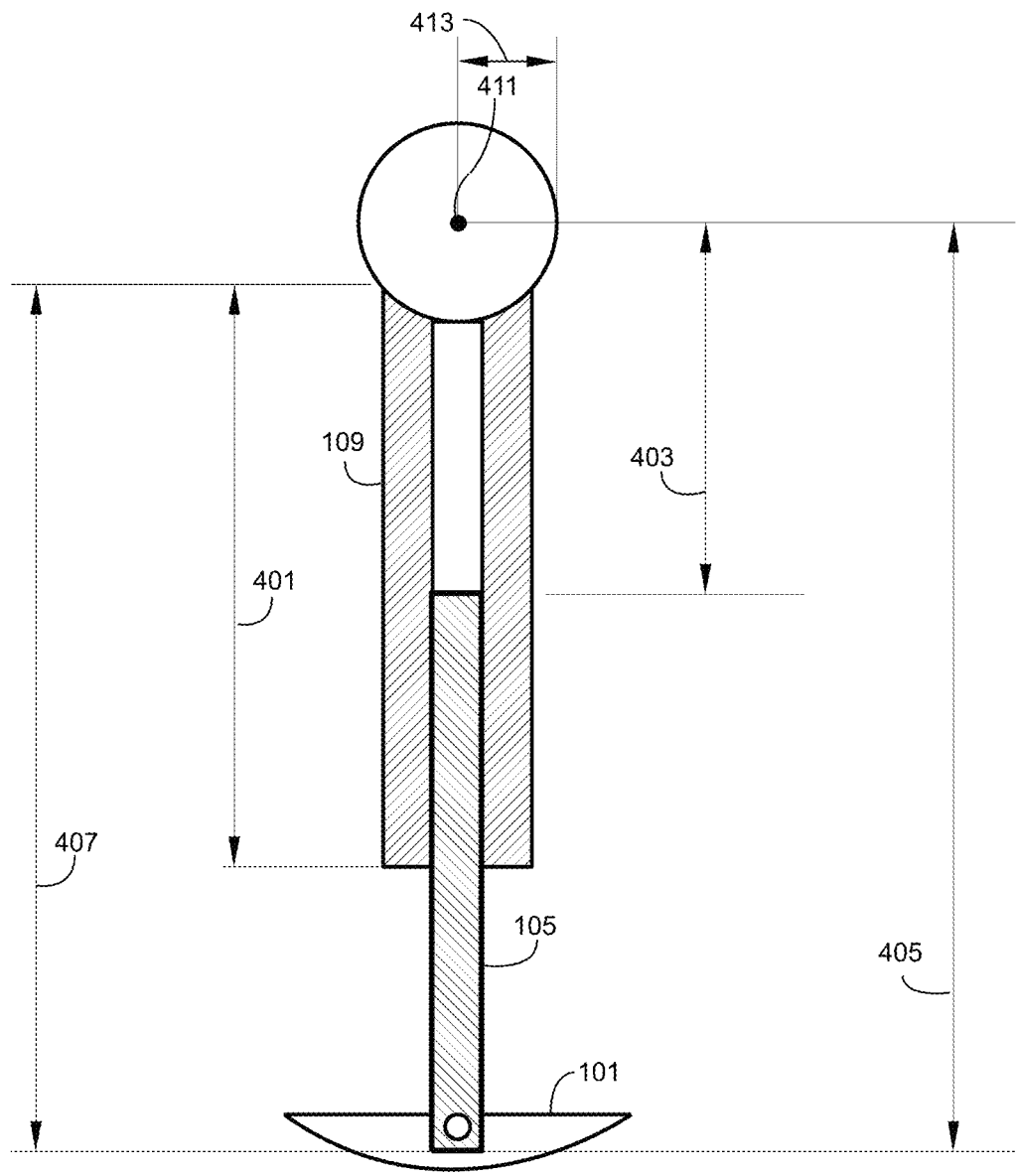
FIG. 4 is an elevation view of a radial segment showing relative dimensions of components of the segment according to an embodiment of the present disclosure.

FIG. 4 is an elevation view of an embodiment of a radial segment showing relative dimensions of components. Radial segment 100 is shown as a single telescoping element comprised of sleeve 109 and spoke 105. A shoe 101 is connected to an end of spoke 105. The other end of spoke 105 is inserted into the internal volume of sleeve 109 and is linearly moveable in relation to the sleeve 109. The distance between the center of hub 411 and the end of spoke 105 defines the midpoint outer radius ($R_m$) 405. $R_m$ 405 defines the radius of the wheel when spokes 105 are in their midpoint extended position. In other words, $R_m$ represents half the nominal diameter of the wheel, or the nominal outer radius of the wheel. The hub radius ($R_h$) 413 is defined as the distance between the center of the hub 411 and a point on the outer circumference of the hub. A travel limit ($limit_t$) represents the amount travel distance the spoke 105 can travel within the interior volume of the sleeve 109. $limit_t$ may have a value between 0.00 and 1.00. A value of 0.00 would specify no movement, or in other words, a fixed length radial segment. A value of 1.00 would indicate no overlap between the telescoping segments formed by spoke 105 and the sleeve 109. This would result in structural instability where the spoke 105 is fully extended. By way of non-limiting example, a reasonable value for $limit_t$ would be 0.85, which would allow 85% of the length of the interior volume of sleeve 109 for linear travel of spoke 105. The remaining 15% would represent overlap of the segments to provide structural stability.

The sleeve length ($length_{sleeve}$) 401 may then be defined by the relationship:

$$length_{sleeve} = \frac{R_m - R_h}{(2.00 - limit_t) + (0.5 * limit_t)} \quad \text{Equation (1)}$$

The spoke length ($length_{spoke}$) 407 is the length of the adjustable spoke-segment and is defined by:

$$length_{spoke} = (2.0 - limit_t) * length_{sleeve} \quad \text{Equation (2)}$$

The distance from the hub 411 of the wheel to the second end of spoke 105 when at mid-position is the spoke radius ($R_s$) 403 and may be defined as:

$$R_s = R_h + (0.5 * length_{sleeve}) \quad \text{Equation (3)}$$

Using the above equations, the dimensions for the sleeve 109 and spoke 105 for a radial segment 100 may be calculated for any desired midpoint Radius ($R_m$) 405.

For example, for a wheel having the dimensions:
$R_m$=0.5 meter;
$R_h$=0.05 meter; and
$limit_t$=0.85; the following dimensions may be calculated:
$length_{sleeve}$=0.2857 meter;
$length_{spoke}$=0.3286 meter;
and $R_s$=0.1929 meter.

The above calculations result in optimal dimensions for the sleeve 109 and spoke 105 in the sense that they provide an adjustable radius that is maximally variable as compared to its mid-point outer radius. While it should be understood that other relative dimensions could be used, they would result in reduced radial variable as a function of the mid-point outer radius value. Furthermore, while the examples are shown from the perspective of a single element telescoping structure, the formulas may be adapted by one of ordinary skill in the art to apply to radial segments having a larger number of telescoping segments.

Where used in this description, the term processor or computer may include computer processors that may be implemented in hardware, software or a combination of both. For example, some modules may be implemented in hardware and other modules implemented in software in any combination. Software may be stored in the form of instructions that when executed by a processor, cause the processor to perform certain processing steps. The processing steps may include use of one or more algorithms disclosed in this patent application to calculate values. The software instructions may be stored on a non-transitory computer readable medium. The computer readable medium, for example, may be a flash memory, random access memory (RAM), read only memory (ROM), an optical disk, magnetic disk or other form factor of memory suitable for storing said instructions. The processor may be in communication with the memory and receive instructions or processing data from the memory. Similarly, the processor may store intermediate processing data or results in the memory. This data may be available for later retrieval by the processor or by other components of a given system incorporating the processor and memory.

Figure 5:
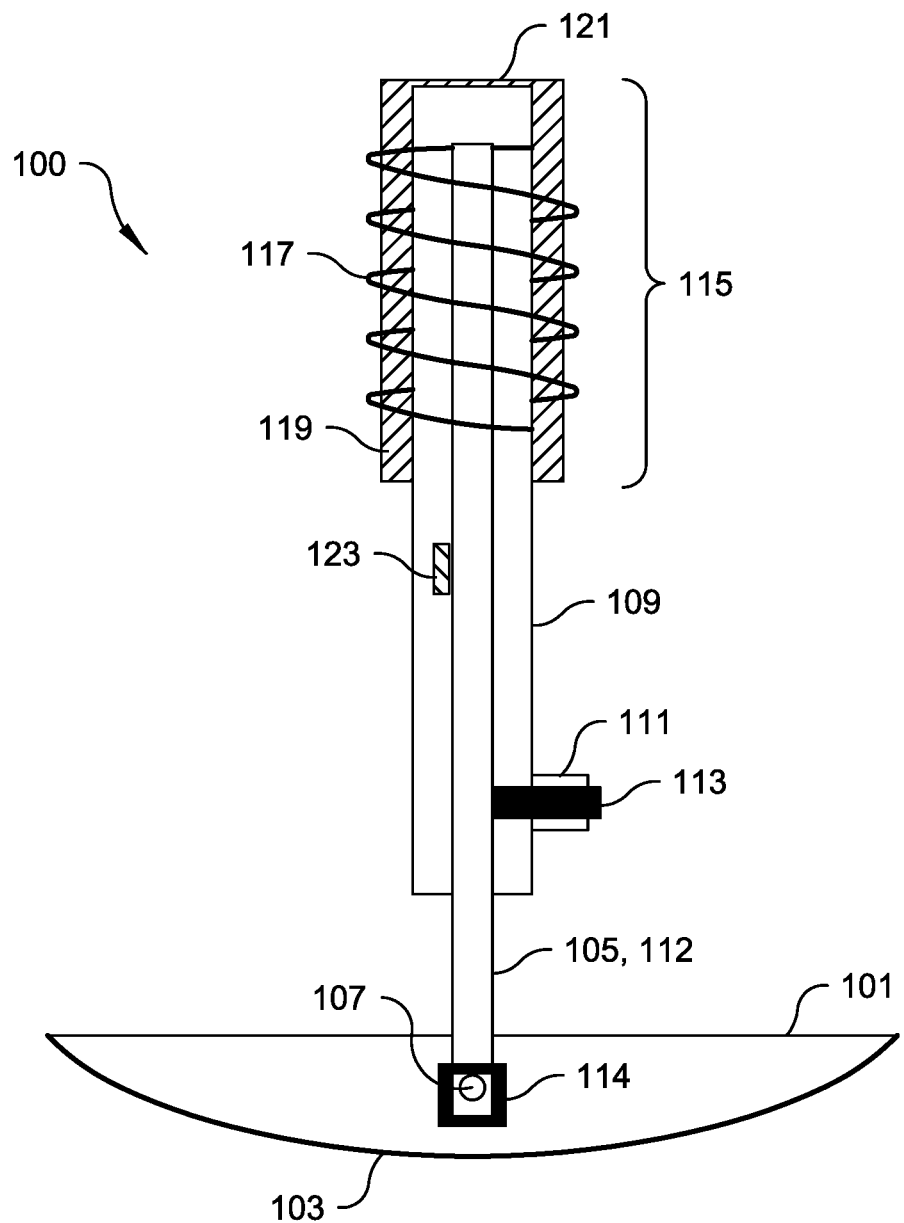
FIG. 5 is a partial cross-sectional view of a radial segment according to another embodiment of the present disclosure.

FIG. 5 illustrates a wheel assembly 100 having features similar to those described above with respect to FIG. 1, with like numerals representing like features. Specifically, in some embodiments, locking mechanism 111 includes locking pin 113 having a free end surface configured to abut an elongated, uniform (i.e. continuous or straight) opposing surface 112 of spoke 105 with sufficient force such that spoke 105 may be secured in the illustrated position only by friction force generated between these opposing surfaces (as distinct from shear forces on pin 113 in the embodiment of FIG. 1). By not engaging with apertures formed in spoke 105 (see FIG. 1), pin 113 of locking mechanism 111 may engage with spoke 105 at nearly any desired position along the length of surface 112 of spoke 105, while not being limited by a minimum spacing requirement between apertures. In this way, the illustrated embodiment provides much finer operational control of wheel assembly 100.

Still referring to FIG. 5, a resistive element 114 may also be provided and configured to either lock the orientation of shoe 101 relative to spoke 105 about wrist joint 107, or provide a resistance to the rotation of shoe 101 about wrist joint 107. In embodiments, resistive element 114 may take the form of a clutch, such as a computer-controlled clutch, or a translatable pin-based locking mechanism having features similar to locking mechanism 111, for selectively fixing the position of shoe 101 relative to spoke 105. Resistive element 14 may take the form of one or more elastic elements, such as a torsion spring or rubber bushing, for resisting rotation of shoe 101 in either direction about wrist joint 107 relative to a neutral, central position illustrated in FIGS. 1 and 5. Fixing, or resisting movement of, the position of shoe 101 when the shoe contacts (or just prior to contact with) the ground ensures that no power loss occurs as the wheel engages with the ground. This arrangement further resists slipping of the shoe during ground-contact from the tangential wheel torques due to accelerations and decelerations of the vehicle. Moreover, by selective controlling and/or fixing the position of shoes 101 about wrist pin 107 (e.g. by a control signal generated by computer 306 operatively coupled to a locking mechanism), smooth transitions between spokes as they transfer between bearing weight during rotation may be realized.

Figure 6:
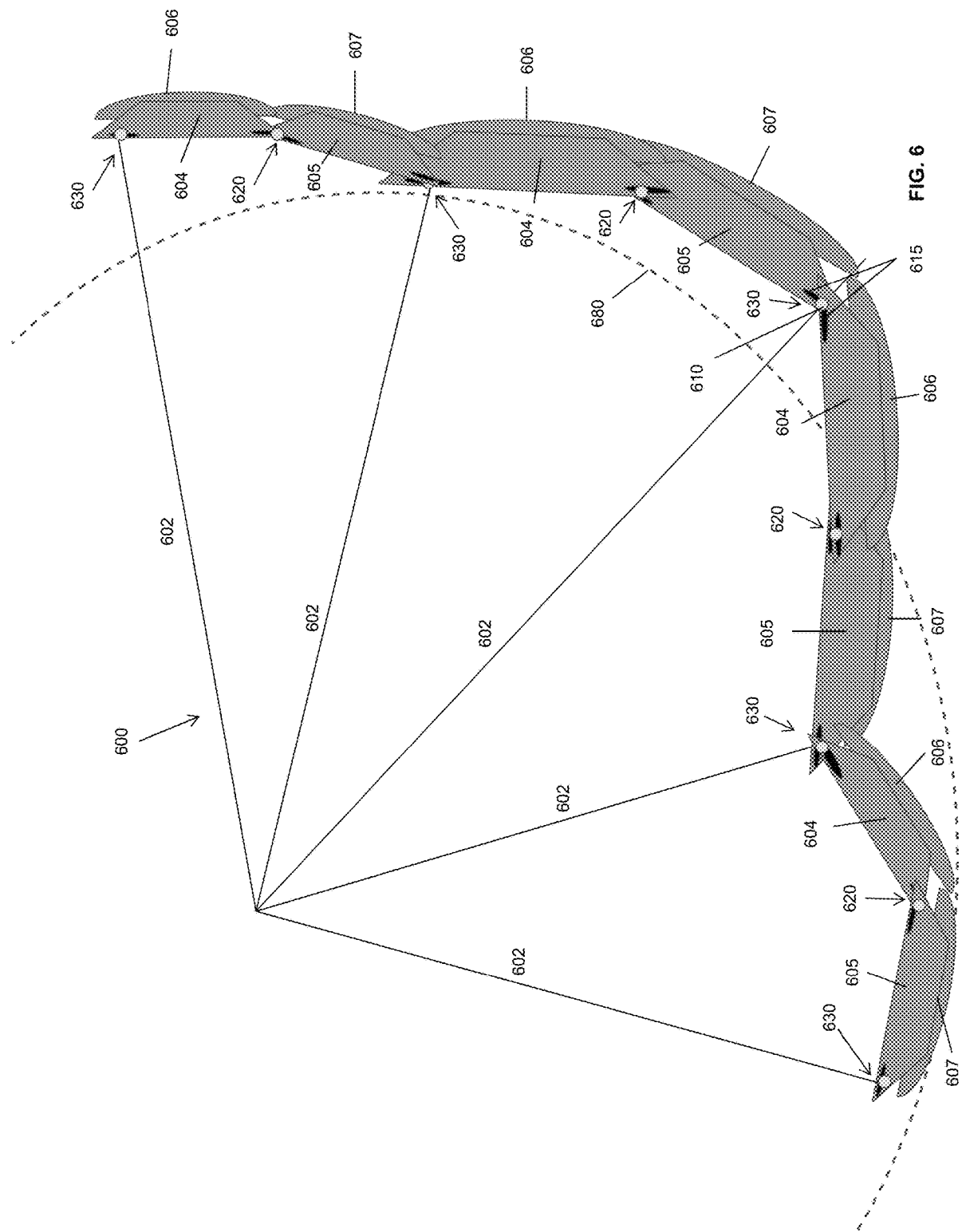
FIG. 6 is a partial view of a simplified wheel assembly according to an embodiment of the present disclosure.

Referring now to FIG. 6, another embodiment of a wheel assembly 600 according to the present disclosure is shown. Wheel assembly 600 (only a portion of which is illustrated) includes radially-moveable spokes 602 which may comprise features similar to those set forth above with respect to FIGS. 1-5. Wheel assembly 600 further comprises a plurality of shoes 604,605. Specifically, in the illustrated portion of wheel assembly 600, pairs of shoes 604,605 are arranged generally between each pair of adjacent spokes 602. Each pair of shoes 604,605 may also referred to as a single shoe comprising two sub-shoes 604,605.

Each pair of shoes 604,605, or sub-shoes, may be pivotally connected together. Specifically, each pair of shoes 604,605 may be pivotally connected at a joint 620 arranged intermediate (or generally between ends of) each pair of spokes 602. Likewise, adjacent shoes 604,605 arranged on either side of a given spoke 602 may be pivotally connected to one another, as well as pivotally connected to the spoke, at a joint 630. In this way, in aggregate, shoes 604,605 may define a chain or series of pivotally connected shoes or sub-shoes. With each spoke 602 of wheel assembly 600 arranged at a common length (e.g., arranged in a fully retracted position), this series of shoes may define a generally uniform circle 680.

Shoes 604,605 further comprise respective contact surfaces 606,607, which may be configured to at least partially overlap one another when the wheel assembly defines generally uniform circle 680. More specifically, and referring generally to the bottom view of two shoes 604,605 as shown in FIG. 7, contact surfaces 606,607 of shoes 604,605 may define interdigitated or overlapping fingers. In other embodiments, contact surfaces 606,607 of shoes 604,605 may be configured only to abut one another in this radial position, or may be configured to define a gap therebetween, without departing from the scope of the present disclosure.

Referring again to FIG. 6, joints 620,630 may comprise pins 610 arranged through apertures 615 formed through each shoe 604,605. In one embodiment, each aperture 615 comprises a slotted opening. In other embodiments, only one of the apertures of a pair of joined shoes 604,605 is slotted, with the other comprising a circular opening, for example. The use of slotted apertures 615 enables joints 620,630 to permit both the rotation of shoes 604,605 relative to one another, as well as linear translation therebetween. In this way, joints 620,630 define both pivotable and slideable connections for accommodating differing lengths of adjacent spokes (as illustrated in FIG. 6), as well as to permit more flexibility and movement of shoes 604,605 when wheel assembly 600 is traversing uneven terrain.

In the embodiment of FIG. 6, the angle of shoes 604,605 relative to spokes 602 may be controlled by altering the relative lengths of adjacent spokes 602. Moreover, as set forth above with respect to FIG. 5, independent control mechanisms (e.g., computer controlled clutches associated with joints 630) may also be implemented to enable smooth transition between spokes as they transfer between bearing weight during rotation. In particular, the position of the shoe may be locked just prior to contacting the ground. The embodiment of FIG. 6 also further facilitates nearly constant wheel-hub altitude (or height relative a constant reference frame) as weight transfers between spokes.

Referring now to FIGS. 8A, 8B and 9, more detailed views of exemplary shoes (e.g., shoe 604 and/or 605) are provided. Referring generally to FIGS. 8A and 8B, exemplary shoe 604 includes a monolithic body 612 having slotted apertures 615 formed therethrough. Body 612 further defines contact surfaces 606 protruding therefrom. Apertures 615 along with pins 610 arranged therein, define joints 620,630 between adjacent shoes as illustrated in FIG. 6. Pins 610 may further include heads 611 on either end thereof. One or more springs 640 (e.g., coil springs) may be attached to each pin 610 (e.g., via heads 611) on a first end thereof, and attached to body 612 on a second end thereof. Springs 640 are configured to resist rotation of pins 610, as well as to restrain their linear motion within apertures 615. Exemplary springs 640 may be replaced with other elastic or friction-based arrangements (e.g., elastic bushings, torsion springs, etc.), as set forth above with respect to FIG. 5, without departing from the scope of the present disclosure. As shown in FIG. 8B, body 612 of shoe 604 may define a recess 650 on a first end thereof and a protrusion 660 on a second end thereof through which apertures 615 are formed. Recess 650 is configured to receive a similar protrusion of an adjacent shoe, while protrusion 660 is configured to engage with a recess of another adjacent shoe.

Referring generally to FIG. 9, in an alternate embodiment, shoe 604 comprises features-similar to those set forth above with respect to FIGS. 8A and 8B, including slotted apertures 615, springs 640 and pins 610. However, as illustrated, pins 610 extend through clevis-like portions of adjacent shoes 905, with the first ends of springs 640 attached thereto. Springs 640 are configured to bias pins 610 centrally within apertures 615, as well as to resist relative rotation between shoes 604 and 905. Accordingly, in the exemplary embodiment, only shoe 604 comprises slotted apertures 615, with adjacent shoes either fixedly attaching to pins 610, or accepting pins 610 via circular apertures.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This detailed description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. An adaptable wheel comprising:
    a central hub;
    a plurality of radial segments connected to the central hub at a proximal end and extending radially from the central hub, each radial segment comprising a linear actuator having a fixed portion and a spoke movable with respect to the fixed portion, the linear actuator configured to change a length of the radial segment in response to a first control signal;

a plurality of shoes, wherein each of the plurality of shoes is rotatably connected to an end of one of the spokes and configured to contact a surface being traversed by the wheel, and a resistive element configured to resist rotation of the shoe from a first angular orientation relative to the spoke, wherein the resistive element comprises a locking mechanism configured to selectively lock the position of the shoe relative to the spoke in response to a second control signal.

2. An adaptable wheel comprising:

a central hub;

a plurality of radial segments connected to the central hub at a proximal end and extending radially from the central hub, each radial segment comprising a linear actuator having a fixed portion and a spoke movable with respect to the fixed portion, the linear actuator configured to change a length of the radial segment in response to a first control signal; and a plurality of shoes, wherein each of the plurality of shoes is rotatably connected to an end of one of the spokes and configured to contact a surface being traversed by the wheel, wherein first and second shoes of the plurality of shoes are arranged between first and second adjacent radial segments of the plurality of radial segments, the first shoe comprising a first end rotatably coupled to an end of the spoke of the first radial segment and a second end rotatably coupled to a first end of the second shoe; the second shoe comprising a second end rotatably coupled to an end of the spoke of the second radial segment; and wherein third and fourth shoes of the plurality of shoes are arranged between the second radial segment and a third radial segment adjacent to the second radial segment.

3. The adaptable wheel of claim 2, wherein:

the third shoe comprises a first end rotatably coupled to an end of the spoke of the second radial segment and rotatably coupled to the second end of the second shoe, and a second end rotatably coupled to a first end of the fourth shoe; and the fourth shoe comprises a second end rotatably coupled to an end of the spoke of the third radial segment.

4. The adaptable wheel of claim 3, wherein:

the second shoe is slideably coupled to the end of the spoke of the second radial segment; and the third shoe is slideably coupled to the end of the spoke of the second radial segment.

5. The adaptable wheel of claim 4, wherein the second shoe is slideably coupled to the third shoe.

6. The adaptable wheel of claim 4, wherein the second shoe is slideably coupled to the end of the spoke of the second radial segment.

7. A vehicle wheel system, comprising:

a plurality of segmented wheels, each wheel comprising:
 a central hub;
 a plurality of radial segments connected to the central hub at a proximal end and extending radially from the central hub, each radial segment comprising a linear actuator having moveable spoke, the linear actuator configured to change a length of the radial segment in response to a first control signal; and
 a plurality of shoes, wherein each of the plurality of shoes is rotatably connected to an end of one of the spokes and configured to contact a surface being traversed by the wheel;
 a computer processor configured to calculate a target radial segment length and generate the first control signal indicative of the target radial segment length, and a locking mechanism configured to selectively lock the position of the shoe relative to the spoke in response to a second control signal generated by the computer processor.

* * * * *